(12) United States Patent
Yasui et al.

(10) Patent No.: US 10,572,194 B2
(45) Date of Patent: Feb. 25, 2020

(54) INFORMATION PROCESSING APPARATUS COMMUNICABLE WITH LABEL PRINTING DEVICE

(71) Applicant: Brother Kogyo Kabushiki Kaisha, Nagoya-shi, Aichi-ken (JP)

(72) Inventors: Ryo Yasui, Nagoya (JP); Jun Komura, Nagoya (JP); Ryoji Ban, Nagoya (JP)

(73) Assignee: Brothey Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/243,407

(22) Filed: Jan. 9, 2019

(65) Prior Publication Data

US 2019/0212951 A1    Jul. 11, 2019

(30) Foreign Application Priority Data

Jan. 11, 2018   (JP) .................................. 2018-002649

(51) Int. Cl.
*G06F 3/12*   (2006.01)

(52) U.S. Cl.
CPC .......... *G06F 3/1205* (2013.01); *G06F 3/1243* (2013.01); *G06F 3/1253* (2013.01); *G06F 3/1286* (2013.01)

(58) Field of Classification Search
None
See application file for complete search history.

(56) References Cited

U.S. PATENT DOCUMENTS

| 2009/0138812 A1* | 5/2009 | Ikedo | ...................... G06F 17/24 |
| | | | 715/769 |
| 2015/0347877 A1* | 12/2015 | Kanda | .................. G06K 15/022 |
| | | | 358/1.15 |

FOREIGN PATENT DOCUMENTS

| JP | 2006-243388 A | 9/2006 |
| JP | 2008-304959 A | 12/2008 |
| JP | 2009-093246 A | 4/2009 |

\* cited by examiner

*Primary Examiner* — Andrew H Lam
(74) *Attorney, Agent, or Firm* — Banner & Witcoff, Ltd.

(57) ABSTRACT

A non-transitory storage medium storing instructions that cause an information processing apparatus to serve as: a display controller that displays an edit screen including a setting region for setting of a print processing to be executed by a label printing device, an edit region for editing of an object to be printed, and a selection region for selection of the object; an obtainer that obtains selected data, as at least a portion of at least one data, when an operation of copying the at least the portion being selected on a data display screen, to the edit screen is input; and a determiner that determines whether the obtained selected data is data in tabular format. The display controller displays at least one candidate data on the selection region based on the selected data when the obtained selected data is data in tabular format.

12 Claims, 10 Drawing Sheets

FIG.2

|   | 1 | 2 | 3 | 4 | 5 | 6 |
|---|---|---|---|---|---|---|
|   | a1abc | b1 abc | c1 abc | d1 abc | e1abc | f1 |
|   | a2 abc | b2abc | /c2abc | d2/abc | e2abc/ | f2 |
|   | a3abc* | b3a*bc | *c3abc | /d3abc | e3/abc | f3 |
|   | a4abc/ | @b4abc | c4"@abc | d4abc"@ | e4abc | f4 |
|   |   | b5abc | c5abc | d5abc | e5abc | f5 |
|   | a6abc | b6abc | c6abc | d6abc | e6abc | f6 |
|   | a7abc | b7abc | c7abc | d7abc |   | f7 |
|   |   | b8abc | c8abc | d8abc | e8abc | f8 |
|   |   | b9abc | c9abc | d9abc | e9abc | f9 |
|   |   | b10abc | c10abc | d10abc | e10abc | f10 |
|   | a11abc |   |   |   | e11abc | f11 |
|   | a12abc | b12?abc | c12abc? | d12abc | e12abc | f12 |
|   | 0x08a13abc | b13a0x08 | c13a0x08 | d13a0x08 | e13a0x08 | f13 |

Printer: AB-11

Sheet: 102mm × 152mm
Sheet Detection

Margins: 6mm

Orientation: ⦿ Landscape  ○ Portrait

Unselected

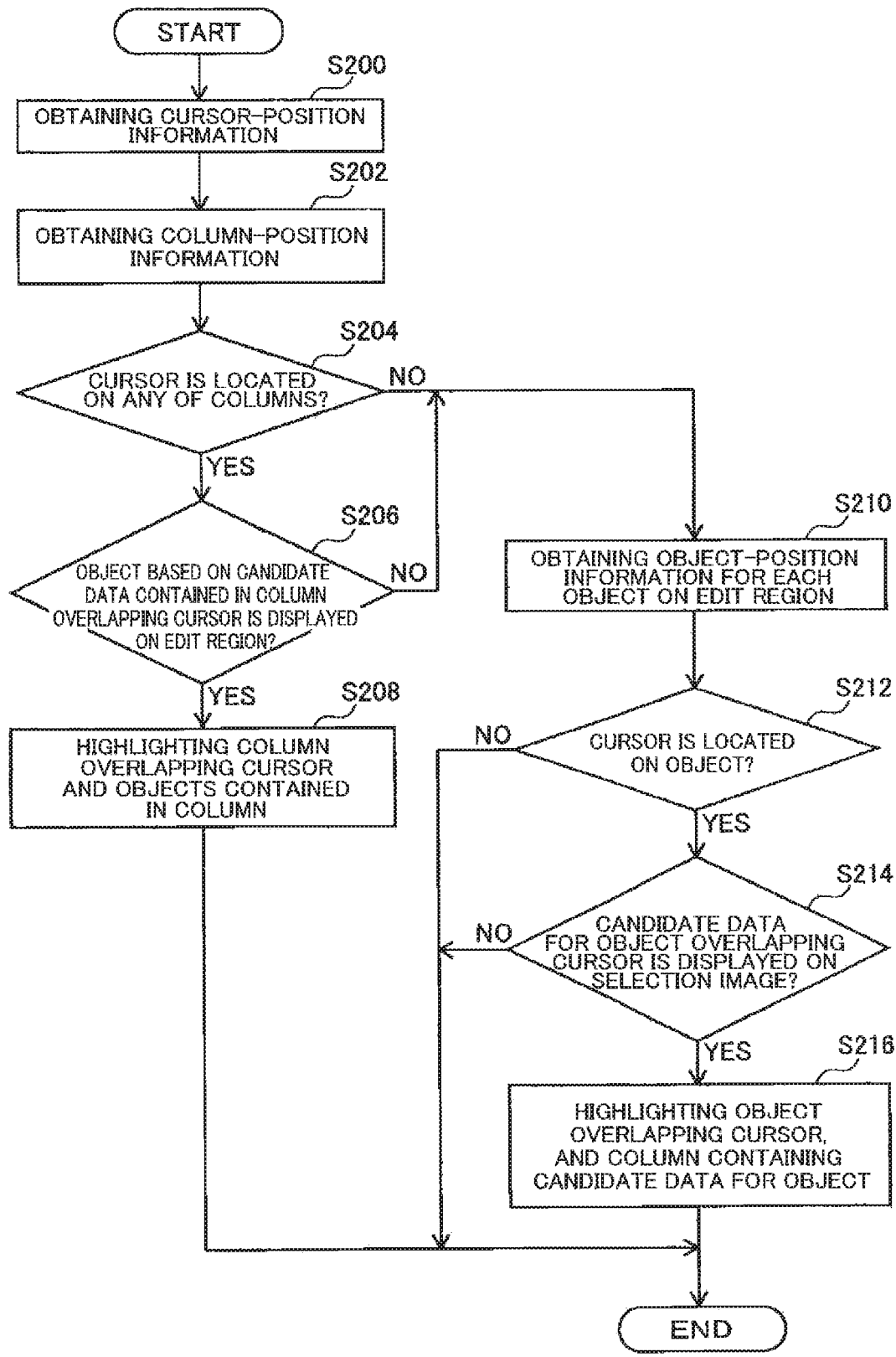

INFORMATION PROCESSING APPARATUS COMMUNICABLE WITH LABEL PRINTING DEVICE

CROSS REFERENCE TO RELATED APPLICATION

The present application claims priority from Japanese Patent Application No. 2018-002649, which was filed on Jan. 11, 2018, the disclosure of which is herein incorporated by reference in its entirety.

BACKGROUND

The following disclosure relates to a non-transitory storage medium storing a plurality of instructions readable by a computer of an information processing apparatus which is capable of communicating with a label printing device configured to print an image indicated by an object, on a label, relates to the information processing apparatus, and relates to a method of processing information in the information processing apparatus.

There is known an information processing apparatus communicable with a label printing device. In this information processing apparatus, a data table can be displayed by opening a list window in a state in which an edit display screen (a layout window) is displayed. Data in the displayed data table are sequentially assigned to objects arranged on the edit display screen to create corresponding labels.

SUMMARY

In the conventional information processing apparatus, however, "Open Data Creating Window" needs to be selected in a window menu to display the list window in the state in which the edit display screen is displayed, making it difficult for a user to recognize operations and resulting in complicated operations. Accordingly, an aspect of the disclosure relates to a non-transitory storage medium storing a plurality of instructions readable by a computer of the information processing apparatus, the information processing apparatus, and a method of processing information in the information processing apparatus, which enable a user to display a data table on an edit display screen with a simple operation to easily create a label.

In one aspect of the disclosure, a non-transitory storage medium stores a plurality of instructions readable by a computer of an information processing apparatus. The information processing apparatus includes: a communication interface communicable with a label printing device configured to print an image indicated by an object, on a label; a display; and an operation interface. When executed by the computer, the plurality of instructions cause the information processing apparatus to serve as: a display controller configured to display an edit screen on the display, the edit screen including (i) a setting region for setting of a print processing to be executed by the label printing device, (ii) an edit region for editing of the object to be printed by the label printing device, and (iii) a selection region for selection of the object to be printed by the label printing device, from at least one candidate data as a candidate for the object when the at least one candidate data is data in tabular format constituted by at least one of a row and a column; an obtainer configured to obtain selected data, as at least a portion of at least one data, via an operating system executed by the information processing apparatus when an operation of copying the at least the portion of the at least one data to the edit screen is input via the operation interface in a state in which the at least the portion of the at least one data is selected on a data display screen containing the at least one data and displayed on the display; and a determiner configured to determine whether the selected data obtained by the obtainer is data in tabular format constituted by at least one of a row and a column. The display controller is configured to display at least one candidate data on the selection region based on the selected data when the determiner determines that the selected data obtained by the obtainer is data in tabular format.

In another aspect of the disclosure, an information processing apparatus includes: a communication interface communicable with a label printing device configured to print an image indicated by an object, on a label; a display; an operation interface; and a controller configured to serve as: a display controller configured to display an edit screen on the display, the edit screen including (i) a setting region for setting of a print processing to be executed by the label printing device, (ii) an edit region for editing of the object to be printed by the label printing device, and (iii) a selection region for selection of the object to be printed by the label printing device, from at least one candidate data as a candidate for the object when the at least one candidate data is data in tabular format constituted by at least one of a row and a column; an obtainer configured to obtain selected data, as at least a portion of at least one data, via an operating system executed by the information processing apparatus when an operation of copying the at least the portion of the at least one data to the edit screen is input via the operation interface in a state in which the at least the portion of the at least one data is selected on a data display screen containing the at least one data and displayed on the display; and a determiner configured to determine whether the selected data obtained by the obtainer is data in tabular format constituted by at least one of a row and a column. The display controller is configured to display at least one candidate data on the selection region based on the selected data when the determiner determines that the selected data obtained by the obtainer is data in tabular format.

Yet another aspect of the disclosure relates of a method of processing information in an information processing apparatus. The information processing apparatus includes: a communication interface communicable with a label printing device configured to print an image indicated by an object, on a label; a display; and an operation interface. The method includes: a display step of displaying an edit screen on the display, the edit screen including (i) a setting region for setting of a print processing to be executed by the label printing device, (ii) an edit region for editing of the object to be printed by the label printing device, and (iii) a selection region for selection of the object to be printed by the label printing device, from at least one candidate data as a candidate for the object when the at least one candidate data is data in tabular format constituted by at least one of a row and a column; an obtaining step of obtaining selected data, as at least a portion of at least one data, via an operating system executed by the information processing apparatus when an operation of copying the at least the portion of the at least one data to the edit screen is input via the operation interface in a state in which the at least the portion of the at least one data is selected on a data display screen containing the at least one data and displayed on the display; and a determining step of determining whether the selected data obtained in the obtaining step is data in tabular format constituted by at least one of a row and a column. The display step includes displaying at least one candidate data on the selection region based on the selected data when it is determined in the determining step that the selected data obtained in the obtaining step is data in tabular format.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which:

FIG. 2 is a view of a data indicating image and an edit screen;
FIG. 10 is a flowchart of representing the control program.

DETAILED DESCRIPTION OF THE EMBODIMENT

Hereinafter, there will be described one embodiment by reference to the drawings.

Configuration of Printer System

Figure 1:
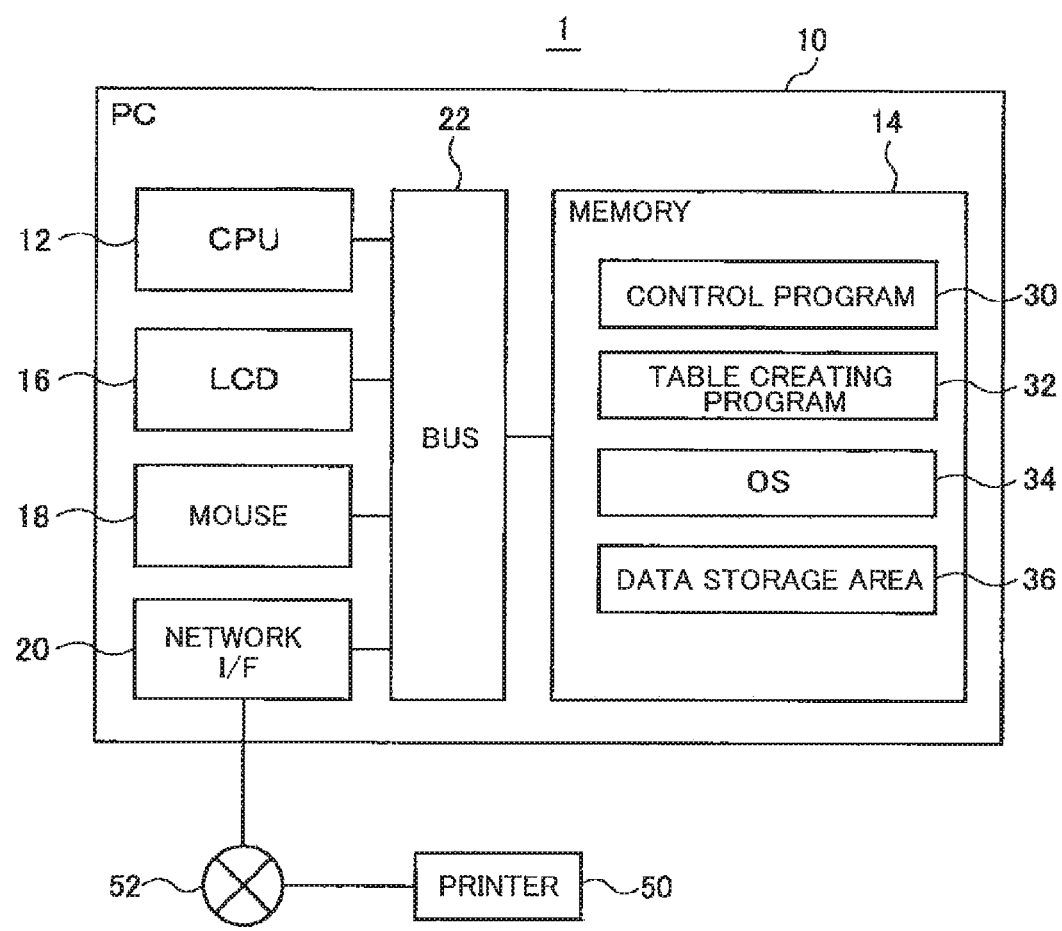
FIG. 1 is a block diagram illustrating a printer system.

FIG. 1 illustrates a printer system 1 according to the present embodiment. As illustrated in FIG. 1, the printer system 1 includes a PC 10 (one example of an information processing apparatus) and a printer 50 (as one example of a label printing device).

The PC 10 includes a CPU 12 (as one example of a computer and a controller), a memory 14, an LCD 16 (as one example of a display), a mouse 18 (as one example of an operation interface), and a network interface 20 (as one example of a communication interface). These devices are communicable with each other by a bus 22.

The PC 10 is capable of communicating with the printer 50 via the network interface 20 and a network 52. Examples of the communication method include a wired LAN, a USB, a Wi-Fi (registered trademark), and Bluetooth (registered trademark).

One example of the printer 50 is a label printer that transmits and receives various kinds of information and instruction signals to and from the PC 10 and is controlled by the PC 10 to create a label on which desired information such as a text and an image is printed. It is noted that the printer 50 creates a label by printing an object on an elongated tape such as a laminate film, for example.

The CPU 12 executes processings according to a control program 30 (as one example of a plurality of instructions), a table creating program 32, and an OS 34 stored in the memory 14. The control program 30 is a program for creating image data representing an image to be printed by the printer 50. The table creating program 32 is, for example, a spreadsheet program. According to the table creating program 32, the CPU 12 creates image data representing an image to be displayed in tabular form constituted by at least one of columns and rows and displays the image in tabular form based on the image data. The OS 34 (as one example of an operating system) is a program which provides basic functions to be used by the control program 30, for example.

Examples of the OS 34 include Windows (registered trademark), Mac OS (registered trademark), Linux (registered trademark), Android (registered trademark), and iOS (registered trademark). In the following description, the CPU 12 that executes the control program 30 may be simply referred to as the name of the program, for example. For example, wordings "the control program 30 executes" may mean "the CPU 12 that executes the control program 30 executes".

The memory 14 has a data storage area 36 as one example of a storage. The data storage area 36 is an area for storing information such as data required for execution of the control program 30, for example. It is noted that the memory 14 is constituted by a combination of a RAM, a ROM, a flash memory, an HDD, a buffer provided for the CPU 12, and other similar devices.

It is noted that the memory 14 may be a storage medium readable by a computer. The storage medium readable by the computer is a non-transitory medium. Examples of the non-transitory medium include recording media, such as a CD-ROM and a DVD-ROM, in addition to the above-described examples. The non-transitory medium is also a tangible medium. An electric signal for transferring a program downloaded from, e.g., a server on the Internet is a signal medium readable by the computer as one kind of medium readable by the computer but is not included in the non-transitory storage medium readable by the computer.

The LCD 16 displays various functions of the PC 10. The mouse 18 is an input device which moves a cursor displayed on a screen of the LCD 16 and accepts various operations of a user, such as a drag operation and a click operation. It is noted that other input devices such as a keyboard and a touch screen may be used to accept operations equivalent to the drag operation and the click operation, for example.

Operations of Printer System

In the printer system 1, the table creating program 32 in the PC 10 creates data in tabular format and controls the LCD 16 to display an image in tabular form based on the created data in tabular format. When at least a portion of the data in tabular format which is created by the table creating program 32 is selected by a user operation, the control program 30 controls the LCD 16 to display the data selected by the user operation, as candidate data which is a candidate for an object to be printed. As a result, the data selected by the user operation is connected to a database. The database connection will be described later in detail. When candidate data is specified by a user operation from among the displayed candidate data, the control program 30 controls the LCD 16 based on the specified candidate data to display an object to be printed. When the user performs an editing operation for the object displayed on the LCD 16, the control program 30 creates image data for printing of the object. The control program 30 then transmits the created image data for printing to the printer 50. The printer 50 prints an image on the label based on the transmitted image data.

Specifically, as illustrated in FIG. 2, the table creating program 32 in the PC 10 controls the LCD 16 to display an image 60 in tabular form (hereinafter referred to as "data indicating image 60") based on data in tabular format which is created by the table creating program 32. It is noted that the data indicating image 60 is constituted by a plurality of cells arranged in thirteen rows and six columns, and each of the cells indicates a text thereon based on the data in tabular format.

The control program 30 displays an edit screen 70 on the LCD 16. The edit screen 70 contains a setting region 72, an edit region 74, and an operating region 76. The setting region 72 contains various selecting buttons. The user operates the selecting buttons to set printing conditions for printing of the label. Examples of the selecting buttons displayed on the setting region 72 include: a printer selecting button for selection of the printer to be used to execute a label print processing; and a size selecting button for selecting the size of the label to be printed. The user operates these selecting buttons to set the conditions such as a printer to be used to execute the print processing and the size of the label to be printed.

Figure 5:
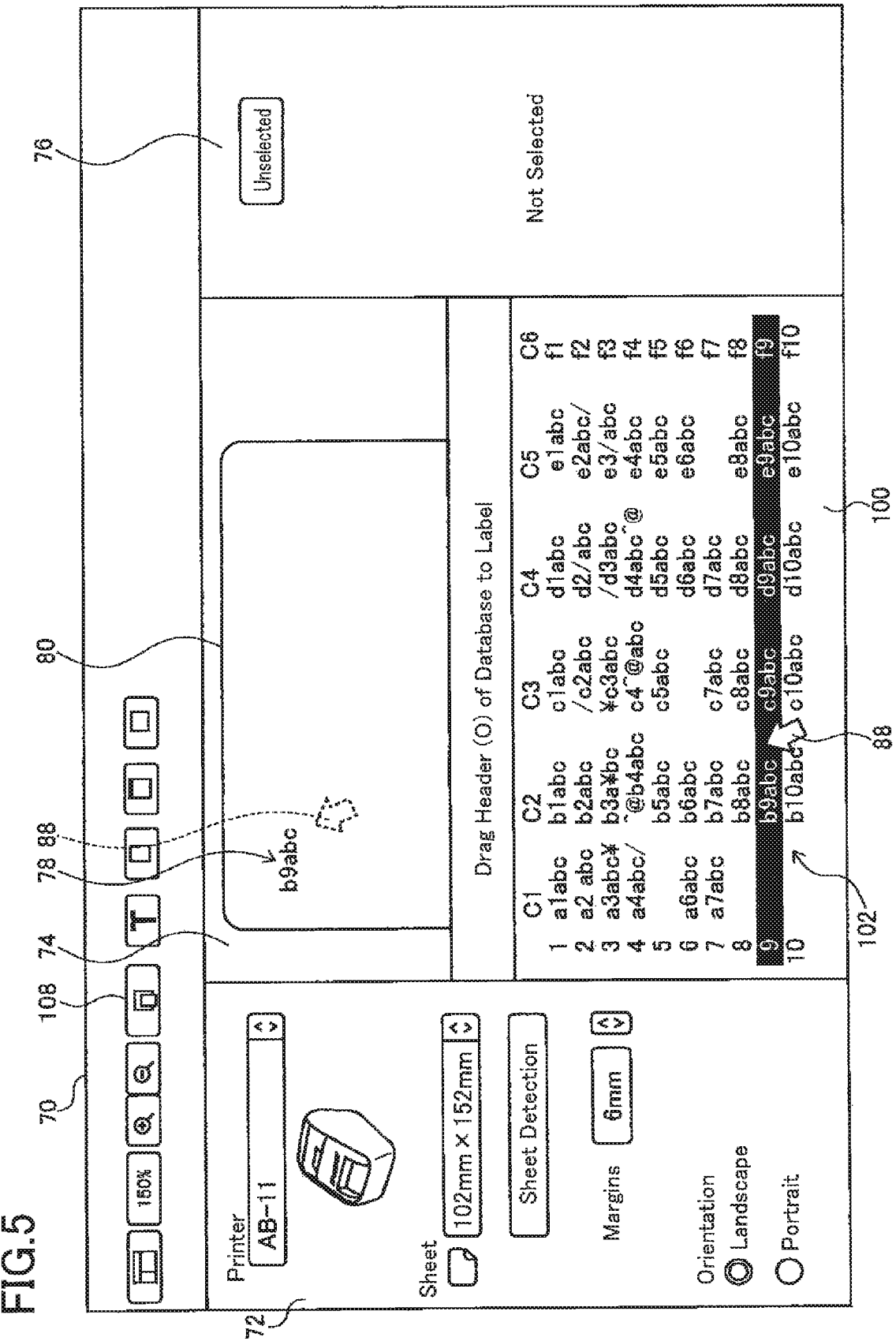
FIG. 5 is a view of the edit screen in the present disclosure.

The edit region 74 contains a preview screen 80 for displaying an object 78 to be printed (see FIG. 5). It is noted that the preview screen 80 has a size related to the size of the label which is set on the setting region 72. The operating region 76 contains various edit buttons for editing the object 78 displayed on the preview screen 80 of the edit region 74. In figures, the edit buttons have not been selected and not displayed.

In the state in which the data indicating image 60 and the edit screen 70 are displayed on the LCD 16, when the user operates the mouse 18 to select at least a portion (an area) of the data indicating image 60 and drags an image in the selected area to a lower side of the edit region 74 of the edit screen 70, data in the selected area is connected to the database.

Specifically, the user first operates the mouse 18 to select cells within any area on the data indicating image 60, for example, an area with ten rows and six columns (which is enclosed by the broken line in FIG. 2). The user then performs a drag and drop for the cells within the selected area (hereinafter referred to as "the selected area 86") to move the cells into the edit region 74 of the edit screen 70. It is noted that the drag and drop is a gesture in which the user operates the mouse 18 to move a cursor 88 onto any image, drags an object by moving the cursor 88 to any position while holding down a left button of the mouse 18, and then drops the object by releasing the left button.

When the selected area 86 is moved by the drag and drop from the data indicating image 60 to the edit region 74 of the edit screen 70, a portion of data constituting the data indicating image 60, which portion is contained in the selected area 86 (hereinafter may be referred to as "selected data") is copied to the edit screen 70. Specifically, when the left button of the mouse 18 is clicked during dragging of the selected area 86, the OS 34 stores data contained in the selected area 86, i.e., the selected data, into the data storage area 36. It is noted that the selected data contains not only data representing a portion of the data indicating image 60 within the selected area 86 but also data representing the form or format of data (e.g., tabular form and text format), the color of data, the font of data, for example. When the selected area 86 is moved to the edit region 74 by the drag and drop, the left button is released, the control program 30 obtains the selected data stored in the data storage area 36.

The control program 30 then determines whether the obtained selected data is data in tabular format. This is because the selected data is data within the selected area 86 selected on the data indicating image 60 and thus is data in tabular format, but the control program 30 in some cases obtains an image different from the data indicating image 60 as the selected data, e.g., image data representing a bit-mapped image. In the determination, the control program 30 determines whether the selected data contains a tag "hasTable", because data in tabular format contains the tag "hasTable". Thus, in the case where the selected data contains the tag "hasTable", the control program 30 determines that the selected data is data in tabular format. In the case where the selected data does not contain the tag "hasTable", the control program 30 determines that the selected data is not data in tabular format.

In the case where the selected data is data in tabular format, the control program 30 creates an empty file in comma-separated values (CSV) format. The control program 30 then converts the obtained selected data to data in CSV format (hereinafter may be referred to as "CSV data") and stores the CSV data into the created empty file in CSV format (noted that a file in CSV format may be hereinafter referred to as "CSV file"). The control program 30 displays an image on a lower side of the edit region 74 of the edit screen 70, based on the data stored in the CSV file, i.e., CSV data.

Figure 3:
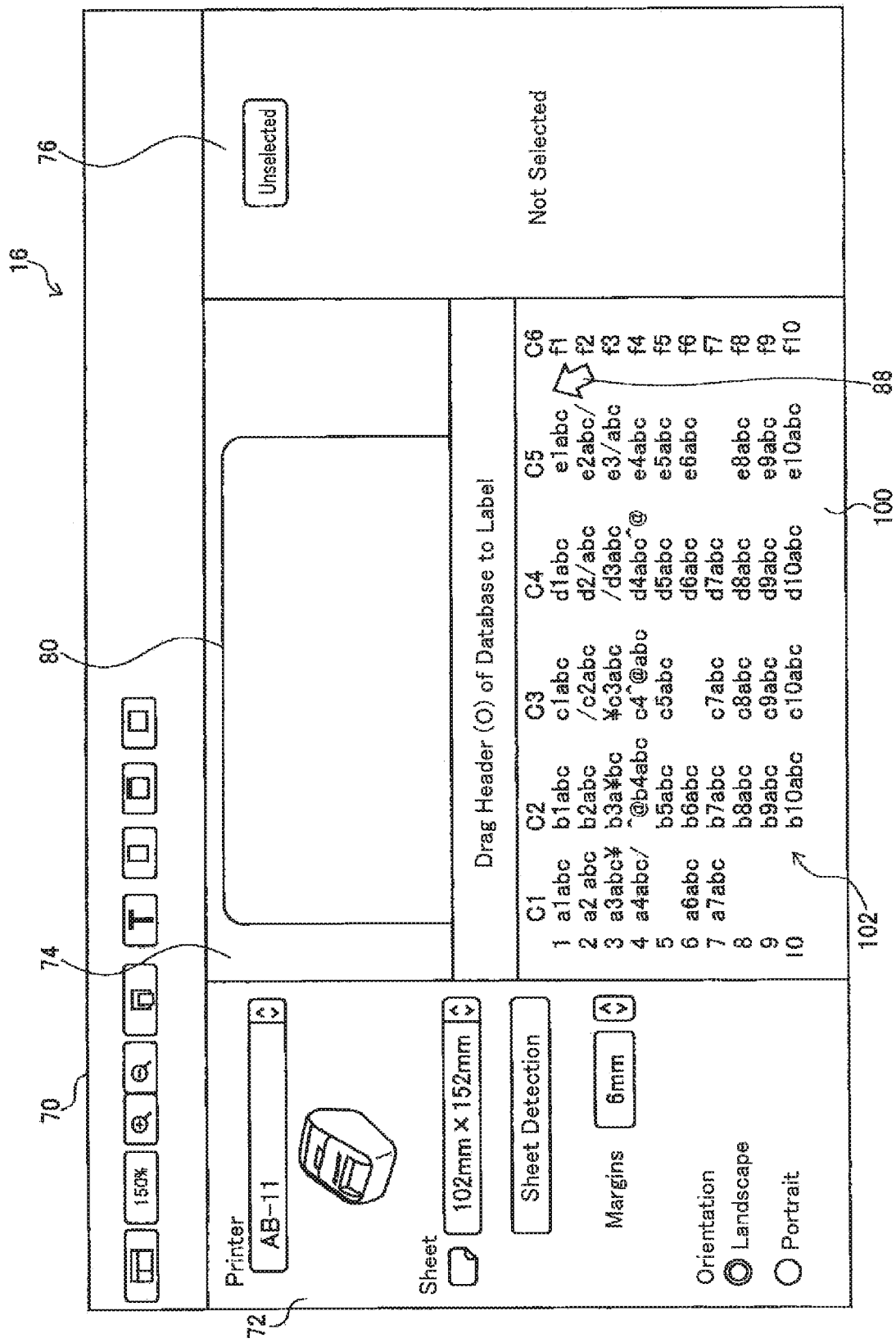
FIG. 3 is a view of the edit screen.

Specifically, since the CSV data is data in tabular format constituted by at least one of rows and columns, the control program 30 displays an image in tabular form based on the CSV data, on a lower side of the edit region 74. It is noted that the CSV data is a candidate for an object to be printed as described later, and thus the CSV data may be referred to as "candidate data". Also, since an object to be printed is selected from the image based on the CSV data, i.e., the image based on the candidate data, the image based on the candidate data may be hereinafter referred to as "selection image", and a region on which the selection image is displayed may be hereinafter referred to as "selection region". That is, as illustrated in FIG. 3, the control program 30 displays a selection region 100 on a lower side of the edit region 74 and displays a selection image 102 on the selection region 100 based on the CSV data. In this operation, the selected data is connected to the database.

Figure 4:
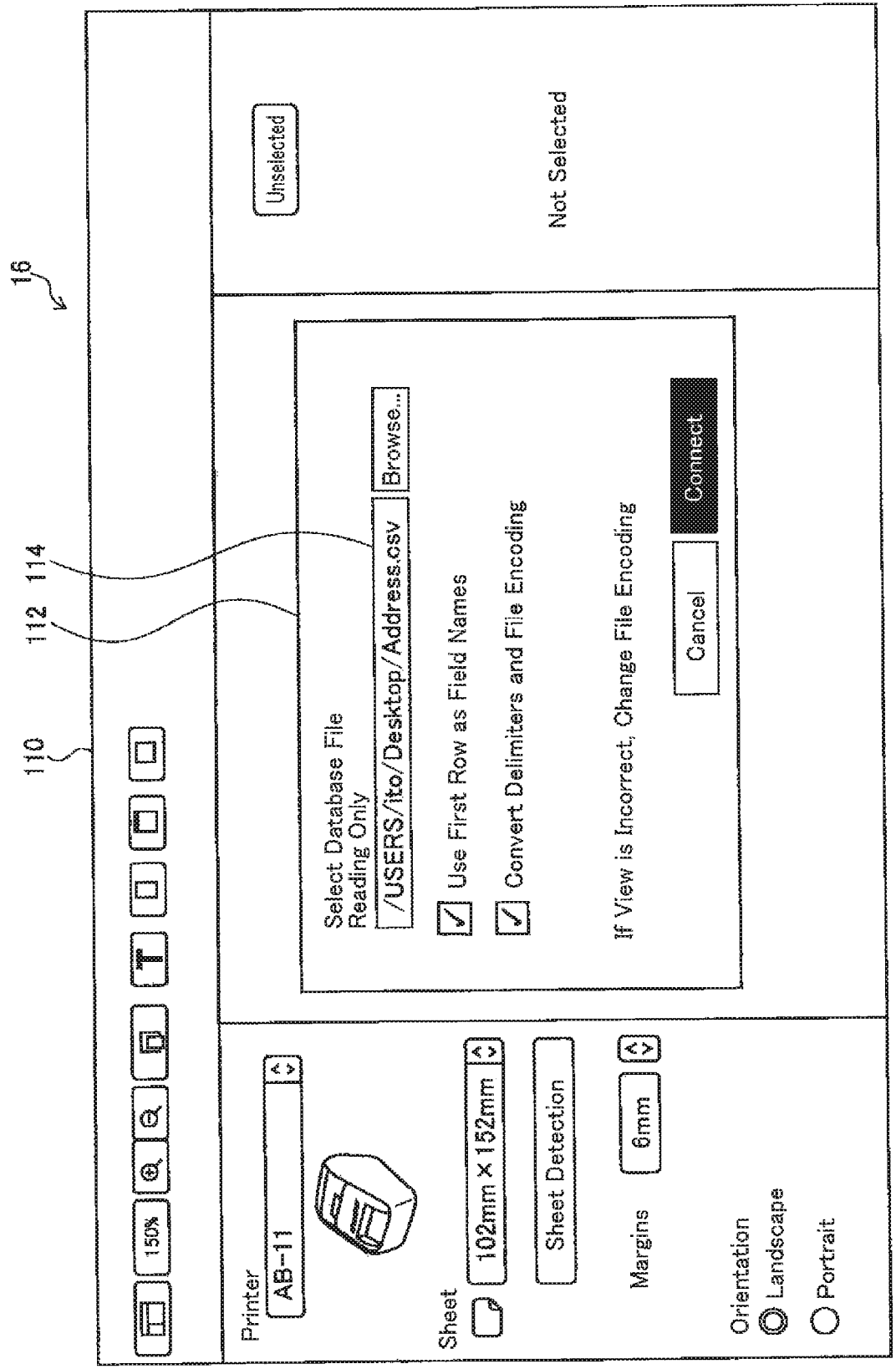
FIG. 4 is a view of a conventional edit screen.

Thus, according to the control program 30, the selected data is connected to the database, and the selection image 102 is displayed on the selection region 100 based on the selected data just by selection of the selected data selected on the data indicating image 60 and copying of the selected data to the edit region 74. In conventional control programs, complicated user operations are required for connection to a database, resulting in low operability. Specifically, as illustrated in FIG. 4, an edit screen 110 is displayed on the LCD 16 according to the conventional control program. When a predetermined button, not illustrated, is operated on the edit screen 110, an input screen 112 is displayed on the edit screen 110.

An input field 114 is displayed on the input screen 112. When the name of a file storing the data indicating image 60 is, for example, input to the input field 114, data of the data indicating image 60 is connected to the database, and the selection image 102 is displayed on the selection region 100 based on the data. However, an input of the file name to the input field 114 is a complicated user operation and has low operability. In the control program 30, in contrast, just a drag and drop causes the selected data to be connected to the database and the selection image 102 to be displayed on the selection region 100 based on the selected data. This improves the operability. Also, all the data constituting the data indicating image 60 is connected to the database in the conventional control program. In the control program 30, in contrast, at least a portion of all the data constituting the data indicating image 60 is selected, and the selected data is connected to the database. This improves convenience to connection to the database.

Figure 6:
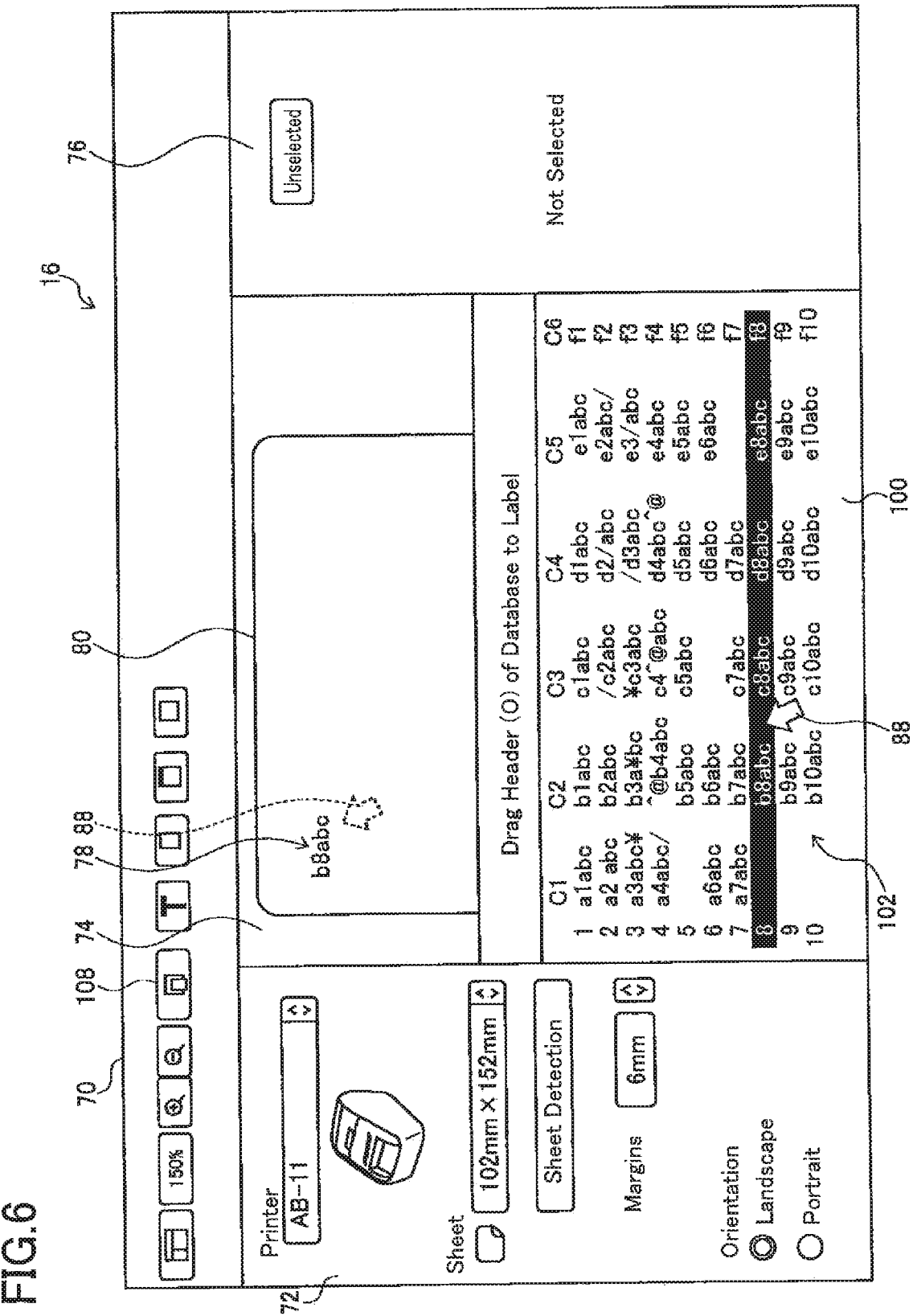
FIG. 6 is a view of the edit screen.

When the selection image 102 is displayed on the selection region 100 according to the control program 30, the user performs a drag and drop of candidate data on the selection image 102 to copy the candidate data from the selection region 100 to the edit region 74, whereby the candidate data is displayed on the preview screen 80 in the edit region 74 as the object 78. That is, for example, as illustrated in FIG. 5, the user operates the mouse 18 to move the cursor 88 onto candidate data "b9abc" located in the second column of the ninth row on the selection image 102. When the cursor 88 is moved onto the selection image 102, one row containing a position overlapping the cursor 88 is highlighted. The user clicks the left button of the mouse 18 in the state in which the cursor 88 is located on the candidate data "b9abc". While holding down the left button, the user operates the mouse 18 to move the cursor 88 to a position on the preview screen 80 in the edit region 74, for example, the position of the cursor 88 which is indicated by the broken line. When the left button of the mouse 18 is released, a character string "b9abc" is displayed as the object 78 at the position of the cursor 88. In this operation, each candidate data in the column designated by the mouse 18 (the second column in this case) and the dropped object 78 ("b9abc" in this case) are associated with each other. Thus, when the user selects another row in the selection image 102, data of the object 78 is changed. For example, as illustrated in FIGS. 5 and 6, when the cursor 88 is moved from the ninth row to the eighth row in the selection image 102, the data of the object 78 is changed from "b9abc" to "b8abc".

Thus, when the editing operation is performed for the object "b9abc" in the state in which the object "b9abc" is displayed on the edit region 74, the object desired by the user is formed. When a print button 108 displayed on an upper portion of the edit screen 70 is operated, the CPU 12 creates image data for printing the object displayed on the edit region 74 and transmits the created image data to the printer 50. The printer 50 executes the label print processing based on the received image data.

In the case where the selected data obtained from the data storage area 36 by the control program 30 is not data in tabular format when the selected data is copied by a drag and drop from the data indicating image 60 to the edit region 74 of the edit screen 70, that is, in the case where the selected data does not contain the tag "hasTable", the control program 30 does not display the selection image 102 on the selection region 100 based on the selected data and displays an image or a text on the preview screen 80 based on the selected data. This is because the selected data is not connected to the database.

In the case where the user desires label printing of an object different from the object "b9abc", when the user selects candidate data for the new object from the selection image 102 on the selection region 100 and copies the selected candidate data to the preview screen 80 of the edit region 74 by a drag and drop, the new object is displayed on the preview screen 80. In this operation, in the case where the newly selected candidate data is contained in the column containing the previously selected candidate data, i.e., the candidate data representing the object "b9abc" displayed on the preview screen 80, the object corresponding to the newly selected candidate data is displayed on the preview screen 80 instead of the object "b9abc" having been displayed. In this operation, in the case where the newly selected candidate data is not contained in the column containing the previously selected candidate data, i.e., the candidate data representing the object "b9abc" displayed on the preview screen 80, the object corresponding to the newly selected candidate data is displayed on the preview screen 80 with the object "b9abc" having been displayed.

Specifically, in the state in which the object "b9abc" is displayed on the preview screen 80, the user operates the mouse 18 to move the cursor 88 onto a position on the selection image 102, e.g., as illustrated in FIG. 6, the candidate data "b8abc" located in the second column of the eighth row on the selection image 102. The candidate data "b8abc" on the selection image 102 is copied to the preview screen 80 by the above-described drag and drop. In this operation, the candidate data "b8abc" on the selection image 102 is moved to a position on the preview screen 80 at which the object "b9abc" has been displayed on the preview screen 80. That is, the left button of the mouse 18 is released in the drag and drop when the cursor 88 is located at the object "b9abc" displayed on the preview screen 80.

The candidate data "b8abc" on the selection image 102 is contained in the column containing the candidate data "b9abc" representing the object "b9abc" displayed on the preview screen 80. Thus, the object "b8abc" corresponding to the candidate data "b8abc" is displayed on the preview screen 80 instead of the object "b9abc" having been displayed. As a result, the object "b8abc" is set as a new object to be printed, instead of the object "b9abc".

Figure 7:
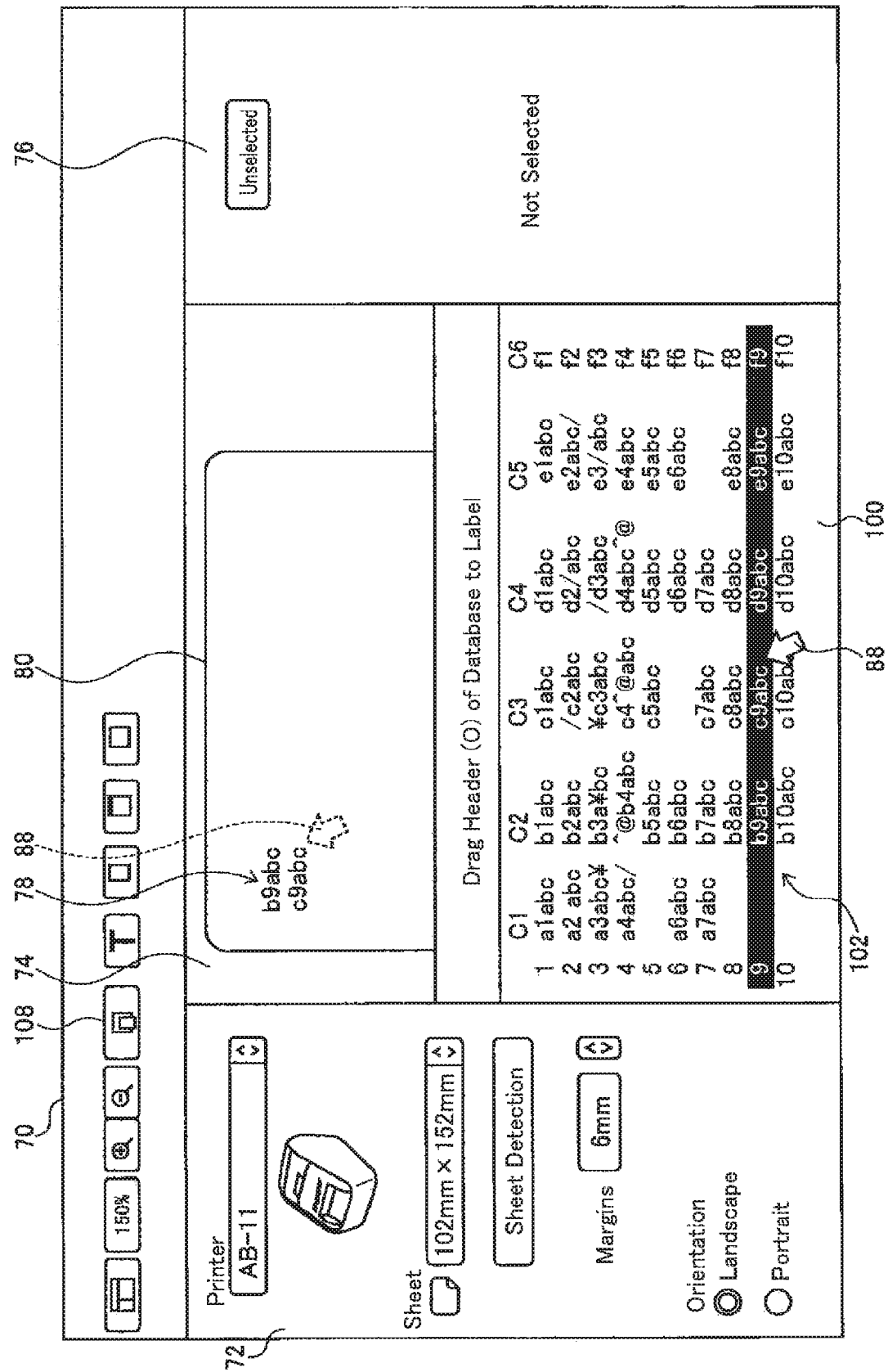
FIG. 7 is a view of the edit screen.

In the state in which the object "b9abc" is displayed on the preview screen 80, the user operates the mouse 18 to move the cursor 88 onto a position on the selection image 102, e.g., as illustrated in FIG. 7, the candidate data "c9abc" located in the third column of the ninth row on the selection image 102. The candidate data "c9abc" on the selection image 102 is copied to the preview screen 80 by the above-described drag and drop. In this operation, the candidate data "c9abc" on the selection image 102 is moved to a position on the preview screen 80 which is located on a lower side of the object "b9abc" displayed on the preview screen 80.

The candidate data "c9abc" on the selection image 102 is not contained in the column containing the candidate data "b9abc" representing the object "b9abc" displayed on the preview screen 80. Thus, the object "c9abc" corresponding to the candidate data "c9abc" is displayed on the preview screen 80 with the object "b9abc" having been displayed. As a result, the object constituted by the object "b9abc" and the object "c9abc" is set as a new object to be printed.

More objects may be displayed on the preview screen 80. Specifically, the candidate data "d9abc" located in the fourth column of the ninth row on the selection image 102 is copied to the preview screen 80 by a drag and drop in the state in which the object "b9abc" and the object "c9abc" are displayed on the preview screen 80, for example. In this operation, the candidate data "d9abc" on the selection image 102 is moved to a position on the preview screen 80 which is located on a lower side of the object "c9abc" displayed on the preview screen 80. As a result, the object "d9abc" is displayed on a position of the preview screen 80 which is located on a lower side of the object "c9abc".

The candidate data "e9abc" located in the fifth column of the ninth row on the selection image 102 is moved to the preview screen 80 by a drag and drop. In this operation, the candidate data "e9abc" on the selection image 102 is moved to a position on the preview screen 80 which is located on a lower side of the object "d9abc" displayed on the preview screen 80. As a result, the object "e9abc" is displayed on the preview screen 80 at the position located on a lower side of the object "d9abc".

Furthermore, the candidate data "e9abc" located in the fifth column of the ninth row on the selection image 102 is moved to the preview screen 80 again by a drag and drop. In this operation, the candidate data "e9abc" on the selection image 102 is moved to a position on the preview screen 80 which is located to the right of the object "b9abc" displayed on the preview screen 80. As a result, the object "e9abc" is displayed on the preview screen 80 at the position located to the right of the object "b9abc".

Figure 8:
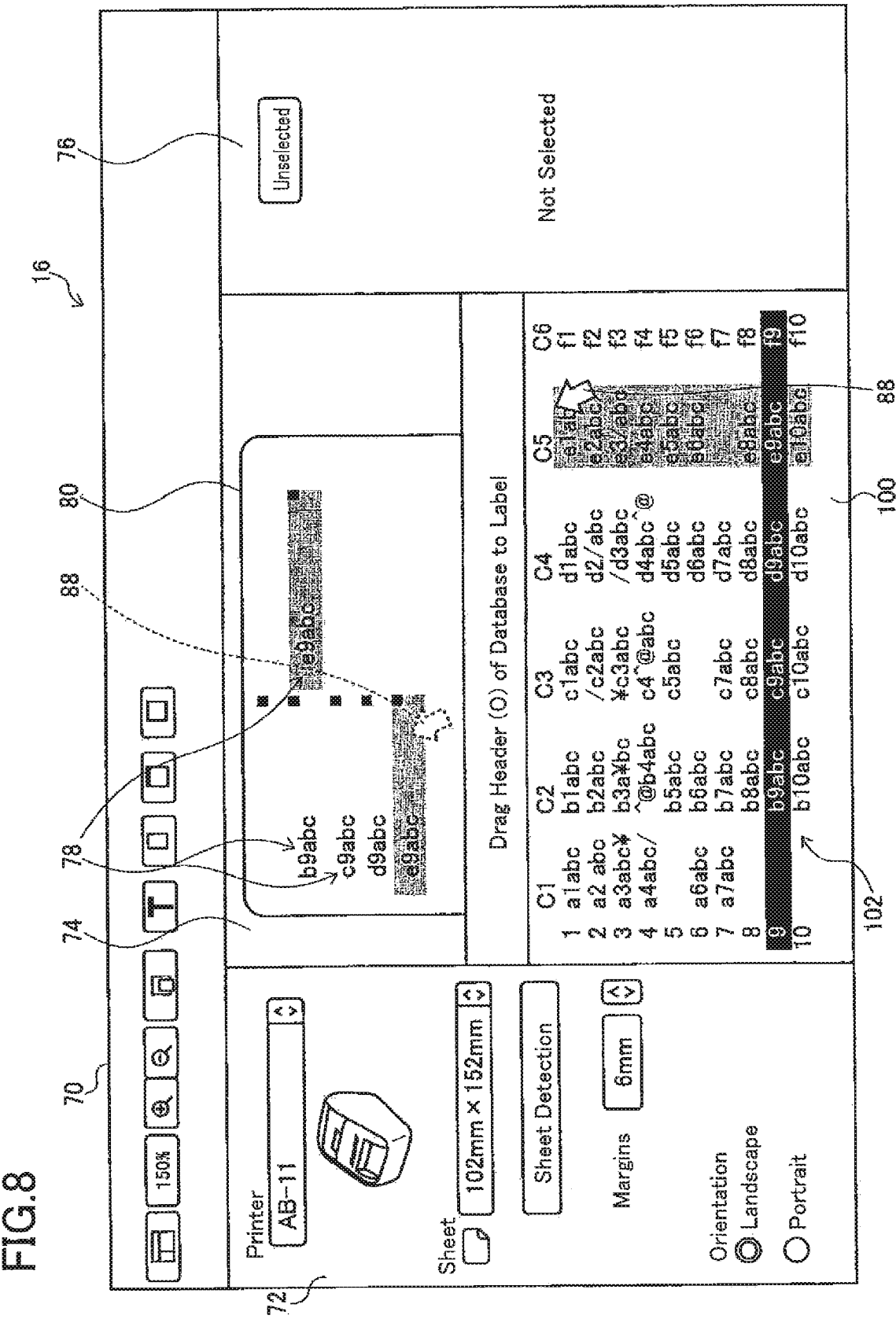
FIG. 8 is a view of the edit screen.

Thus, when the candidate data on the selection image 102 is copied to the preview screen 80 by a drag and drop a plurality of times, as illustrated in FIG. 8, the objects "b9abc", "c9abc", "d9abc", and "e9abc" are displayed on a left portion of the preview screen 80, and the object "e9abc" is displayed on a right portion of the preview screen 80.

It is noted that, when one of the objects 78 displayed on the preview screen 80 is operated, the operated object 78 is highlighted. In the case where an object or objects that are the same as the operated object 78 are displayed on the preview screen 80, the object or objects are also highlighted. Not only the object or objects but also the column containing the candidate data for the operated object is highlighted on the selection image 102 on the selection region 100.

Specifically, for example, when the object "e9abc" located on the left portion of the preview screen 80 is operated on the preview screen 80 illustrated in FIG. 8, the operated object "e9abc" and the object "e9abc" located on the right portion of the preview screen 80 are highlighted. The column containing the candidate data "e9abc" representing the object "e9abc", i.e., the fifth column is also highlighted on the selection image 102 on the selection region 100.

Also in the case where the candidate data for one of the plurality of objects 78 displayed on the preview screen 80 is operated on the selection image 102, the operated column is highlighted, and furthermore the object or objects corresponding to the candidate data contained in the operated column among the objects 78 displayed on the preview screen 80 are also highlighted.

Specifically, for example, when the fifth column is operated on the selection image 102 illustrated in FIG. 8, the operated column is highlighted. Furthermore, the objects "e9abc" corresponding to the candidate data "e9abc" contained in the operated fifth column among the objects 78 displayed on the preview screen 80 are highlighted. That is, the objects "e9abc" located respectively on the right and left portions of the preview screen 80 are highlighted. This configuration makes it possible to easily check the number of the objects of the same kind displayed on the preview screen 80, and the column containing the candidate data representing the objects, for example.

While the field names of the respective columns, i.e., the item names on the uppermost row, are "C1"-"C6" in the selection image 102 illustrated in FIG. 8, these item names may be changed as needed. Specifically, when creating of the data indicating image 60 according to the table creating program 32, the user creates the data indicating image 60 containing item names desired by the user, on the cells in a desired row. For example, the user creates the data indicating image 60 containing "A1", "A2", "A3", "A4", "A5", and "A6" respectively in the cells in the respective first to sixth columns of the third row. The user further colors the inside of the cells in the row, i.e., the third row, in a color different from white.

In the data indicating image 60 created as described above, the user selects the selected area 86 such that the third row, i.e., the row containing "A1-A6" in the respective cells becomes the uppermost row. The user moves the selected area 86 from the data indicating image 60 to the edit region 74 of the edit screen 70 in accordance with the above-described procedure. In this operation, the control program 30 obtains the selected data from the data storage area 36 and determines whether the selected data is data in tabular format. In the case where the selected data is data in tabular format, the control program 30 determines, based on the selected data, whether the cells in the uppermost row in the selected area 86 contain color data different from white (as one example of identification information). In the case where the cells in the uppermost row in the selected area 86 contain the color data different from white, the control program 30 sets wordings in the respective cells in the uppermost row in the selected area 86, to the field names of the respective columns in the selection image 102. This configuration enables easy change in the field names in the selection image 102.

When the selection image 102 is changed, the selected data representing the selection image 102 after the change is connected to the database, but selected data representing the selection image 102 before the change is disconnected from the database. Specifically, when the selected area 86 is newly selected in the data indicating image 60 in the state in which the selection image 102 is displayed on the selection region 100, and the selected area 86 is moved from the data indicating image 60 to the edit region 74 of the edit screen 70 by a drag and drop, the selection image 102 is displayed based on the selected data moved to the edit region 74, instead of the selection image 102 having already been displayed on the selection region 100.

Thus, when the candidate data "A-1" (as one example of first candidate data) is copied to the preview screen 80 by a drag and drop before the selection image 102 is changed, the object "A-1" (as one example of an object based on the first candidate data) is displayed on the preview screen 80. When the cursor 88 is moved to the candidate data "B-1" (as one example of second candidate data), contained in the column containing the candidate data "A-1", on the selection image 102 before the change in the state in which the object "A-1" is displayed on the preview screen 80, the object "B-1" (as one example of an object based on the second candidate data) is displayed on the preview screen 80 instead of the object "A-1". When the selection image 102 is changed in the state in which the object "A-1" is displayed on the preview screen 80, and the cursor 88 is moved to the candidate data "C-1" (as one example of third candidate data), contained in the column containing the candidate data "A-1", on the selection image 102 after the change, the object "C-1" (as one example of an object based on the third candidate data) is not displayed on the preview screen 80 instead of the object "A-1". In the case where the candidate data "C-1" contained in the column containing the candidate data "A-1" is copied to the preview screen 80 by a drag and drop, the object "C-1" is displayed on a lower side of the object "A-1". This is because the object "A-1" and each candidate data contained in the column containing the candidate data "A-1" are disassociated from each other in response to the change of the selection image 102. It is noted that, since the selected data representing the selection image 102 after the change is connected to the database, the object "C-1" and each candidate data contained in the column containing the candidate data "C-1" are associated with each other.

Procedure of Control Program

The display of the selection image 102 on the selection region 100 and the highlight of the object 78 and the column of the selection image 102 are performed by execution of the control program 30 by the CPU 12. There will be next described, with reference to FIGS. 9 and 10, a procedure of processings executed according to the control program 30. This procedure is repeatedly executed in a state in which the control program 30 is activated, and the edit screen 70 is displayed.

Figure 9:
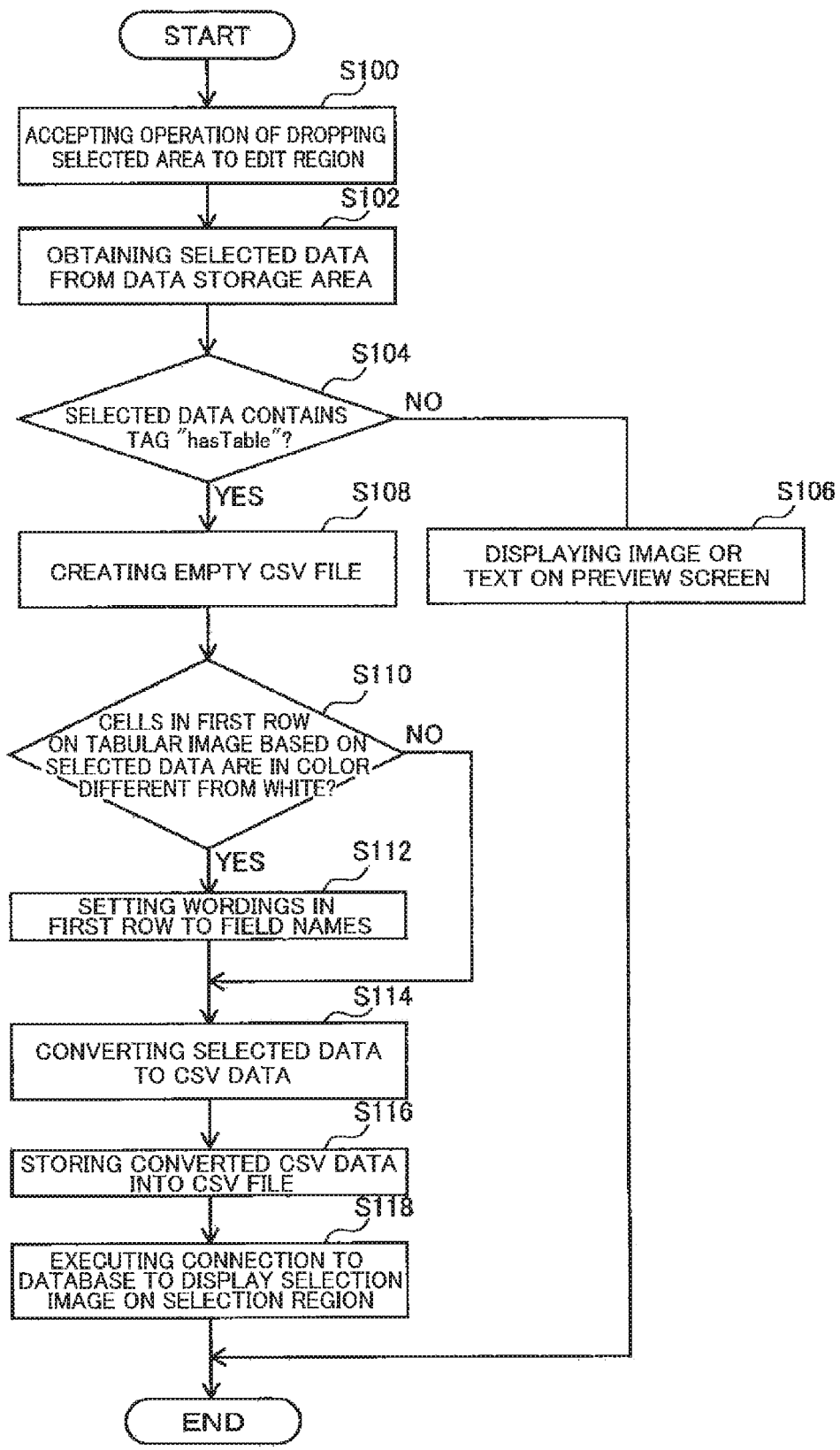
FIG. 9 is a flowchart representing a control program.

When the selection image 102 is displayed on the selection region 100, as illustrated in FIG. 9, the control program 30 at S100 accepts an operation of dropping the selected area 86 to the edit region 74. The control program 30 at S102 obtains the selected data from the data storage area 36. The control program 30 at S104 determines whether the obtained selected data contains the tag "hasTable". When the selected data does not contain the tag "hasTable" (S104: NO), the control program 30 at S106 displays an image or a text on the preview screen 80 based on the selected data, and this flow ends.

When the selected data contains the tag "hasTable" (S104: YES), the control program 30 creates an empty CSV file at 5108. The control program 30 at S110 determines whether cells in the first row on an image in tabular form based on the selected data, i.e., the selection image are in a color different from white. When the cells in the first row on the selection image are in a color different from white (S110: YES), the control program 30 at S112 sets the wordings in the cells in the first row, to the field names on the selection image 102, and this flow goes to S114. When the cells in the first row on the selection image are white (S110: NO), this flow goes to S114. In this case, default wordings are set to the field names.

At S114, the control program 30 converts the selected data to the CSV data. The control program 30 at S116 stores the converted CSV data into the CSV file. The control program 30 at S118 executes connection to the database to display the selection image 102 on the selection region 100, and this flow ends.

When the object 78 and the column of the selection image 102 are highlighted, as illustrated in FIG. 10, the control program 30 at S200 obtains information indicating the position of the cursor 88 (hereinafter may be referred to as "cursor-position information"). The control program 30 at S202 obtains information indicating the position of each column on the selection image 102 (hereinafter may be referred to as "column-position information"). The control program 30 at S204 determines, based on the cursor-position information and the column-position information, whether the cursor 88 is located on any of the columns on the selection image 102.

When the cursor 88 is located on any of the columns on the selection image 102 (S204: YES), the control program 30 at S206 determines whether the object 78 based on the candidate data contained in the column overlapping the cursor 88 is displayed on the edit region 74. When the object 78 based on the candidate data contained in the column overlapping the cursor 88 is displayed on the edit region 74 (S206: YES), the control program 30 at S208 highlights (i) the column overlapping the cursor 88 and (ii) the objects 78 based on the candidate data contained in the column, and this flow ends.

When the control program 30 at S204 determines that the cursor 88 is not located on any of the columns on the selection image 102 (S204: NO) and at S206 determines that the object 78 based on the candidate data contained in the column overlapping the cursor 88 is not displayed on the edit region 74 (S206: NO), the control program 30 at S210 obtains information indicating the position of each of the objects 78 on the edit region 74 (hereinafter may be referred to as "object-position information"). The control program 30 at S212 determines whether the cursor 88 is located on any object, based on the cursor-position information and the object-position information.

When the cursor 88 is located on any object (S212: YES), the control program 30 at S214 determines whether the candidate data representing the object overlapping the cursor 88 is present on the selection image 102. When the candidate data representing the object overlapping the cursor 88 is present on the selection image 102 (S214: YES), the control program 30 at S216 highlights the object overlapping the cursor 88, and the column containing the candidate data representing the object, and this flow ends.

When the control program 30 at S212 determines that the cursor 88 is not located on any object (S212: NO) and at S214 determines that the candidate data representing the object overlapping the cursor 88 is absent on the selection image 102 (S214: NO), this flow ends.

It is noted that the CPU 12 that executes the processing at S102 is one example of an obtainer. The CPU 12 that executes the processing at S104 is one example of a determiner. The CPU 12 that executes the processings at S106, S118, S208, and S216 is one example of a display controller. The CPU 12 that executes the processing at S114 is one example of a creator. The CPU 12 that executes the processing at S116 is one example of a storing controller.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, while a drag and drop is performed to copy the selected data from the data indicating image 60 to the edit region 74 of the edit screen 70 in the above-described embodiment, a copy and paste may be performed to copy the selected data from the data indicating image 60 to the edit region 74 of the edit screen 70. That is, the selected data may be copied on the data indicating image 60 and pasted to the edit region 74.

In the above-described embodiment, when the selected area 86 is newly selected on the data indicating image 60 in the state in which the selection image 102 is displayed on the selection region 100, and the selected area 86 is moved from the data indicating image 60 to the edit region 74 of the edit screen 70 by a drag and drop, the selection image 102 based on the selected data moved to the edit region 74 is displayed instead of the selection image 102 having already been displayed on the selection region 100. When the selected area 86 is newly selected on the data indicating image 60 in the state in which the selection image 102 is displayed on the selection region 100, and the selected area 86 is moved from the data indicating image 60 to the edit region 74 of the edit screen 70 by a drag and drop, the selection image 102 based on the selected data moved to the edit region 74 may be displayed in addition to the selection image 102 having already been displayed on the selection region 100.

In such a configuration, when the candidate data "A-1" (as another example of first candidate data) is copied to the preview screen 80 by a drag and drop on the selection region 100 to which the selection image 102 has not been added, the object "A-1" (as another example of an object based on the first candidate data) is displayed on the preview screen 80. When a new selection image 102 is added to the selection region 100 in the state in which the object "A-1" is displayed on the preview screen 80, and the candidate data "C-1" contained in the column containing the candidate data "A-1" (as one example of third candidate data) is selected on the added selection image 102, the object "C-1" (as one example of an object based on the third candidate data) is displayed on the preview screen 80 instead of the object "A-1". This is because, even when the new selection image 102 is added to the selection image 102 having already been displayed, the selected data representing the selection image 102 having already been displayed is kept connected to the database, and the newly added selection image 102 is connected to the database.

While data indicating a color different from white is employed as the identification information for identifying data constituting the data indicating image 60 in the above-described embodiment, various kinds of information such as the font and the size of characters may be employed as the identification information.

While the processings illustrated in FIGS. 9 and 10 are executed by the CPU 12 in the above-described embodiment, other devices may execute these processings. For example, these processings may be executed by an ASIC or other logical integrated circuits and may be executed by cooperation of the CPU, the ASIC, and other logical integrated circuits, for example.

What is claimed is:

1. A non-transitory storage medium storing a plurality of instructions readable by a computer of an information processing apparatus,
    wherein the information processing apparatus comprises:
        a communication interface communicable with a label printing device configured to print an image indicated by an object, on a label; a display; and an operation interface,
    wherein when executed by the computer, the plurality of instructions cause the information processing apparatus to serve as:
        a display controller configured to display an edit screen on the display, the edit screen comprising (i) a setting region for setting of a print processing to be executed by the label printing device, (ii) an edit region for editing of the object to be printed by the label printing device, and (iii) a selection region for selection of the object to be printed by the label printing device, from at least one candidate data as a candidate for the object when the at least one candidate data is data in tabular format constituted by at least one of a row and a column;
        an obtainer configured to obtain selected data, as at least a portion of at least one data, via an operating system executed by the information processing apparatus when an operation of copying the at least the portion of the at least one data displayed on a data display screen created by another plurality of instructions that is different from the plurality of instructions is input via the operation interface in a state in which the at least the portion of the at least one data is selected on the data display screen displayed on the display; and
        a determiner configured to determine whether the selected data obtained by the obtainer is data in tabular format constituted by at least one of a row and a column,
    wherein the display controller is configured to display at least one candidate data on the selection region based on the selected data when the determiner determines that the selected data obtained by the obtainer is data in tabular format,
    wherein the display controller is configured to not display the at least one candidate data on the selection region based on the selected data when the determiner determines that the selected data obtained by the obtainer is not data in tabular format.

2. The non-transitory storage medium according to claim 1, wherein the display controller is configured to display the object on the edit region based on the selected data when the determiner determines that the selected data is not data in tabular format.

3. The non-transitory storage medium according to claim 1,
    wherein the information processing apparatus comprises a storage,
    wherein when executed by the computer, the plurality of instructions cause the information processing apparatus to serve as:
        a creator configured, when the determiner determines that the selected data is data in tabular format, to create a file based on the selected data, the file being in a form in which the file is disposed on the selection region in tabular form constituted by at least one of a row and a column; and
        a storing controller configured to store the file created by the creator, into the storage,
    wherein the display controller is configured, when the determiner determines that the selected data is the data in tabular format, to display the at least one candidate data on the selection region based on the file created by the creator.

4. The non-transitory storage medium according to claim 1, wherein the display controller is configured to:
    when an operation of designating first candidate data as one of the at least one candidate data displayed on the selection region and designating a placement position on the edit region is input via the operation interface, display a first object at the designated placement position, the first object being an object based on the first candidate data; and
    when an operation of designating second candidate data as candidate data different from the first candidate data and contained in a column in which the first candidate data is designated on the selection region is input via the operation interface after the first object is displayed at the placement position, display a second object at the placement position instead of the first object, the second object being an object based on the second candidate data.

5. The non-transitory storage medium according to claim 4,
    wherein the obtainer is configured to obtain the selected data as at least a portion of at least one data when an operation of copying the at least the portion of the at least one data is input via the operation interface in a state in which one of the first object and the second object is displayed at the placement position, and the at least the portion of the at least one data is selected on the data display screen,
    wherein the display controller is configured, when the determiner determines that the selected data is data in tabular format, to display new at least one candidate data based on the selected data on the selection region, instead of the at least one candidate data having already been displayed on the selection region, and
    wherein the display controller is configured, even when an operation of designating third candidate data as one of the new at least one candidate data displayed on the selection region is input via the operation interface, not to display an object at the placement position based on the third candidate data instead of the one of the first object and the second object.

6. The non-transitory storage medium according to claim 4,
wherein the obtainer is configured to obtain the selected data as at least a portion of at least one data when an operation of copying the at least the portion of the at least one data is input via the operation interface in a state in which one of the first object and the second object is displayed at the placement position, and the at least the portion of the at least one data is selected on the data display screen,
wherein the display controller is configured, when the determiner determines that the selected data is data in tabular format, to display new at least one candidate data based on the selected data on the selection region, in addition to the at least one candidate data having already been displayed on the selection region, and
wherein the display controller is configured, when an operation of designating third candidate data as one of the new at least one candidate data displayed on the selection region is input via the operation interface, to display an object at the placement position based on the third candidate data instead of the one of the first object and the second object.

7. The non-transitory storage medium according to claim 1, wherein the display controller is configured to:
when an operation of designating one candidate data of the at least one candidate data displayed on the selection region and designating a first placement position on the edit region is input via the operation interface, displaying a fourth object at the first placement position based on fourth candidate data as the designated one candidate data; and
when an operation of designating a fifth candidate data contained in a column different from a column in which the fourth candidate data is designated on the selection region and designating a second placement position different from the first placement position on the edit region is input via the operation interface after the fourth object is displayed at the first placement position, display a fifth object at the second placement position based on the fifth candidate data in a state in which the fourth object is displayed at the first placement position.

8. The non-transitory storage medium according to claim 7, wherein the display controller is configured to:
when an operation of designating the column in which the fourth candidate data is designated on the selection region is input via the operation interface in a state in which the fourth object and the fifth object are displayed on the edit region, display the column on the selection region in a manner different from a manner of displaying of another column, and display the fourth object on the edit region in a manner different from a manner of displaying of the fifth object; and
when an operation of designating the column in which the fifth candidate data is designated on the selection region is input via the operation interface, display the column on the selection region in a manner different from a manner of displaying of another column, and display the fifth object on the edit region in a manner different from a manner of displaying of the fourth object.

9. The non-transitory storage medium according to claim 7, wherein the display controller is configured to:
when an operation of designating the fourth object displayed on the edit region is input via the operation interface in a state in which the fourth object and the fifth object are displayed on the edit region, display the fourth object on the edit region in a manner different from a manner of displaying of the fifth object and display a column containing the fourth candidate data on the selection region in a manner different from a manner of displaying of another column; and
when an operation of designating the fifth object displayed on the edit region is input via the operation interface, display the fifth object on the edit region in a manner different from a manner of displaying of the fourth object, and display the column containing the fifth candidate data on the selection region in a manner different from a manner of displaying of another column.

10. The non-transitory storage medium according to claim 1,
wherein the obtainer is configured to obtain the selected data as the at least the portion of the at least one data and identification information for identifying particular data of the at least the portion of the at least one data, and
wherein the display controller is configured to display, on the selection region, candidate data related to the particular data identified by the identification information, such that the candidate data is contained in a set one of a row and a column.

11. An information processing apparatus, comprising:
a communication interface communicable with a label printing device configured to print an image indicated by an object, on a label;
a display;
an operation interface;
a memory configured to store a first set of instruction and a second set of instructions; and
a controller, by executing the first set of instructions, configured to serve as:
a display controller configured to display an edit screen on the display, the edit screen comprising (i) a setting region for setting of a print processing to be executed by the label printing device, (ii) an edit region for editing of the object to be printed by the label printing device, and (iii) a selection region for selection of the object to be printed by the label printing device, from at least one candidate data as a candidate for the object when the at least one candidate data is data in tabular format constituted by at least one of a row and a column;
an obtainer configured to obtain selected data, as at least a portion of at least one data, via an operating system executed by the information processing apparatus when an operation of copying the at least the portion of the at least one data displayed on a data display screen created by the second set of instructions that is different from the first set of instructions is input via the operation interface in a state in which the at least the portion of the at least one data is selected on the data display screen displayed on the display; and
a determiner configured to determine whether the selected data obtained by the obtainer is data in tabular format constituted by at least one of a row and a column,
wherein the display controller is configured to display at least one candidate data on the selection region based on the selected data when the determiner determines that the selected data obtained by the obtainer is data in tabular format, wherein the display controller is configured not to display the at least one candidate data on the selection region based on the selected data when the determiner determines that the selected data obtained by the obtainer is not data in tabular format.

12. A method of processing information in an information processing apparatus,
wherein the information processing apparatus comprises: a communication interface communicable with a label printing device configured to print an image indicated by an object, on a label; a display; and an operation interface,
wherein the method comprises:
  a display step of displaying an edit screen on the display, the edit screen comprising (i) a setting region for setting of a print processing to be executed by the label printing device, (ii) an edit region for editing of the object to be printed by the label printing device, and (iii) a selection region for selection of the object to be printed by the label printing device, from at least one candidate data as a candidate for the object when the at least one candidate data is data in tabular format constituted by at least one of a row and a column;
  an obtaining step of obtaining selected data, as at least a portion of at least one data, via an operating system executed by the information processing apparatus when an operation of copying the at least the portion of the at least one data displayed on a data display screen created by another method that is different from the method is input via the operation interface in a state in which the at least the portion of the at least one data is selected on the data display screen displayed on the display; and
  a determining step of determining whether the selected data obtained in the obtaining step is data in tabular format constituted by at least one of a row and a column, and
wherein the display step comprises displaying at least one candidate data on the selection region based on the selected data when it is determined in the determining step that the selected data obtained in the obtaining step is data in tabular format,
wherein the at least one candidate data is not displayed on the selection region based on the selected data when the determiner determines that the selected data obtained by the obtaining step is not data in tabular format.

* * * * *